(12) United States Patent
Shelton et al.

(10) Patent No.: US 8,870,709 B2
(45) Date of Patent: Oct. 28, 2014

(54) SYSTEM AND APPARATUS FOR ENGINE FLARE CONTROL DURING TRANSMISSION GEAR SHIFT

(75) Inventors: Matthew John Shelton, Grosse Ile, MI (US); Hong Jiang, Birmingham, MI (US); Felix Nedorezov, Rochester Hills, MI (US); Michael John Encelewski, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 13/614,013

(22) Filed: Sep. 13, 2012

(65) Prior Publication Data

US 2013/0296117 A1 Nov. 7, 2013

Related U.S. Application Data

(60) Provisional application No. 61/643,688, filed on May 7, 2012.

(51) Int. Cl.
*B60W 10/08* (2006.01)
*B60W 10/06* (2006.01)
*B60W 20/00* (2006.01)
*F16H 63/50* (2006.01)

(52) U.S. Cl.
USPC ............. 477/3; 477/110; 180/65.285

(58) Field of Classification Search
USPC ............ 477/3, 5, 107, 109, 110, 111; 180/65.285
See application file for complete search history.

(56) References Cited

U.S. PATENT DOCUMENTS

| 5,722,911 | A | * | 3/1998 | Ibaraki et al. ............... 477/3 |
| 5,771,478 | A | * | 6/1998 | Tsukamoto et al. .......... 701/68 |
| 5,903,061 | A | * | 5/1999 | Tsuzuki et al. ............ 290/40 C |
| 7,771,310 | B2 | * | 8/2010 | Tanishima ................. 477/5 |
| 7,971,667 | B2 | | 7/2011 | Yamazaki |
| 8,620,505 | B2 | * | 12/2013 | Sah et al. .................. 701/22 |
| 2009/0058100 | A1 | | 3/2009 | Aitchison et al. |
| 2009/0063028 | A1 | | 3/2009 | Aitchison et al. |

FOREIGN PATENT DOCUMENTS

| GB | 2386932 A | 1/2003 |
| WO | WO0105615 A2 * | 1/2001 |

OTHER PUBLICATIONS

English translation of WO0105615A2, http://translationportal.epo.org, Feb. 18, 2014.*

* cited by examiner

*Primary Examiner* — Roger Pang
(74) *Attorney, Agent, or Firm* — James Dottavio; Brooks Kushman P.C.

(57) ABSTRACT

A vehicle includes an engine, an electric machine, a transmission, and at least one controller. The at least one controller, in response to a gear shift of the transmission that causes a speed of the engine to exceed a predetermined speed, commands a change in current to the electric machine such that the speed of the engine decreases to a target speed to avoid engine flare.

9 Claims, 4 Drawing Sheets

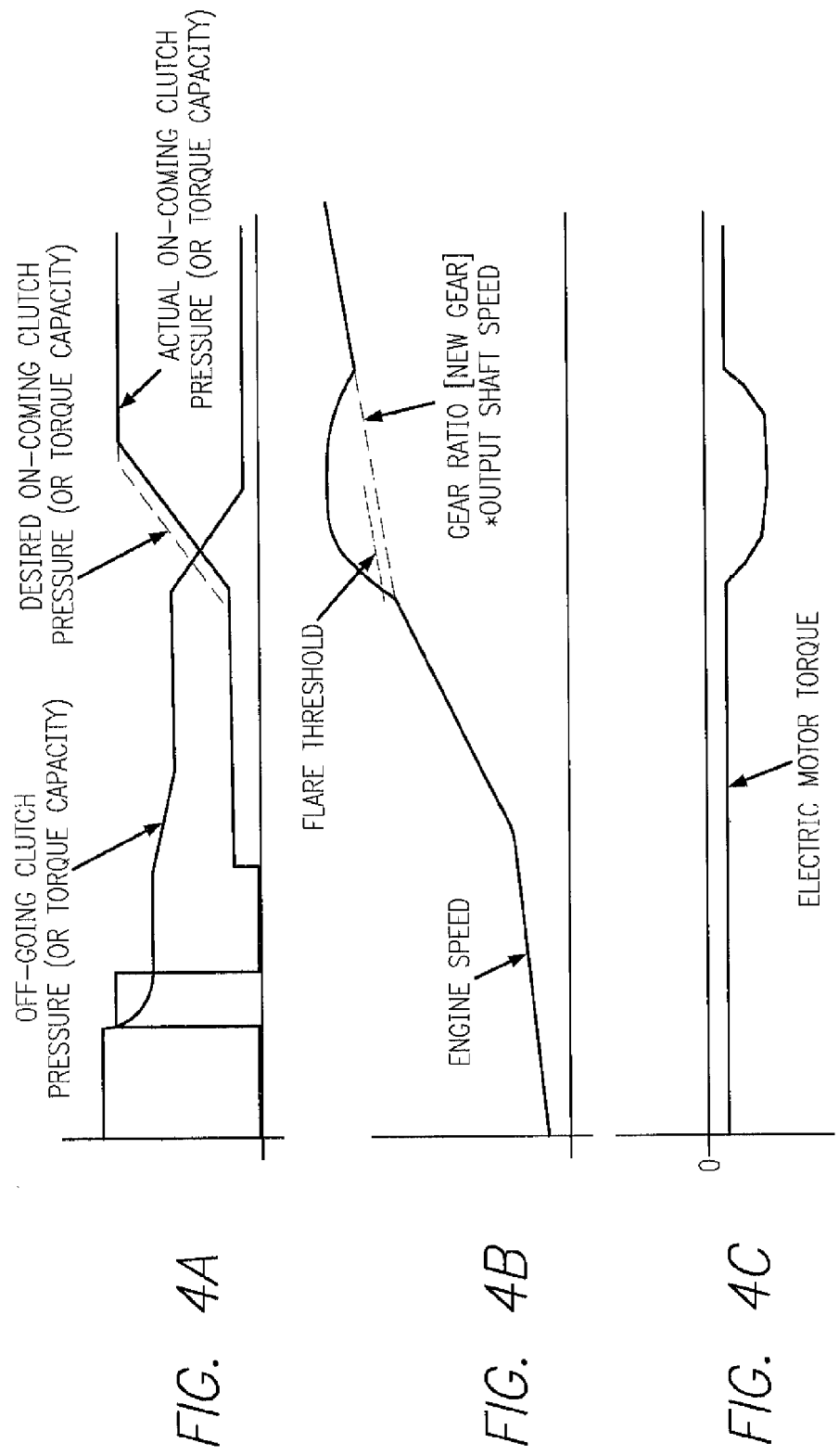

SYSTEM AND APPARATUS FOR ENGINE FLARE CONTROL DURING TRANSMISSION GEAR SHIFT

CROSS-REFERENCE TO RELATED APPLICATION

This application claims the benefit of U.S. Provisional Application No. 61/643,688, filed May 7, 2012, the contents of which are incorporated by reference herein.

TECHNICAL FIELD

The present disclosure relates to controlling engine flare during a gear shift in a transmission.

BACKGROUND

Vehicle manufacturers are developing hybrid vehicles to meet the demand for more fuel efficient vehicles. One configuration for a hybrid vehicle can be referred to as a Modular Hybrid Transmission (MHT) vehicle design. In a so-called MHT vehicle, an electric machine is sandwiched between a conventional automatic step ratio transmission and an engine. The electric machine is attached to the transmission impeller or input shaft. The engine is selectively disconnected from the transmission using a disconnect clutch. The disconnect clutch allows the vehicle to be driven under electric power alone, in hybrid mode with both electric machine and the engine propelling the vehicle, or in a combustion engine only mode in which the vehicle is propelled by the engine only.

As hybrid vehicles have been developed to utilize both an engine and a motor to drive a vehicle transmission, most hybrid systems interact with the transmission through clutches between the drive sources and the transmission. The controls for the various clutches between the sources and within the transmission have complicated the control mechanism, and can reduce efficiency and driveability as the clutches engage and disengage during power distribution adjustment in the driveling.

SUMMARY

A vehicle includes an engine, an electric machine, a transmission, and at least one controller. The at least one controller, in response to a gear shift of the transmission that causes a speed of the engine to exceed a predetermined speed, commands a change in current to the electric machine such that the speed of the engine decreases. The at least one controller may further command a rate of change in current to the electric machine to control a rate of decrease in the speed of the engine. For an up shift of the transmission, the predetermined speed may be greater than the product of a gear ratio of the transmission at a start of the up shift and a speed of an output shaft of the transmission. For a down shift of the transmission, the predetermined speed may be greater than the product of a gear ratio of the transmission at an end of the down shift and a speed of an output shaft of the transmission. The vehicle may further include a clutch configured to mechanically couple the engine and electric machine.

A method for controlling an engine includes, in response to a gear shift of a transmission that causes a speed of the engine to exceed a predetermined speed greater than a target speed, commanding a change in current to an electric machine such that the speed of the engine decreases to the target speed. The method may further include commanding a rate of change in current to the electric machine to control a rate of decrease in the speed of the engine. For an up shift of the transmission, the target speed may be approximately equal to the product of a gear ratio of the transmission at a start of the up shift and a speed of an output shaft of the transmission. For a down shift of the transmission, the target speed may be approximately equal to the product of a gear ratio of the transmission at an end of the down shift and a speed of an output shaft of the transmission.

A vehicle includes an engine, an electric machine, a transmission, and at least one controller. The at least one controller, in response to a gear shift of the transmission that causes a speed of the engine to exceed a predetermined speed greater than a target speed, commands a change in current to the electric machine such that the speed of the engine returns to the target speed. The at least one controller may further command a rate of change in current to the electric machine to control a rate at which the speed of the engine returns to the target speed. For an up shift of the transmission, the target speed may be approximately equal to the product of a gear ratio of the transmission at a start of the up shift and a speed of an output shaft of the transmission. For a down shift of the transmission, the target speed may be approximately equal to the product of a gear ratio of the transmission at an end of the down shift and a speed of an output shaft of the transmission. The vehicle may further include a clutch configured to mechanically couple the engine and electric machine.

BRIEF DESCRIPTION OF THE DRAWINGS

FIGS. 4(a)-(c) illustrate a graph of flare control during down shift.

DETAILED DESCRIPTION

Figure 1:
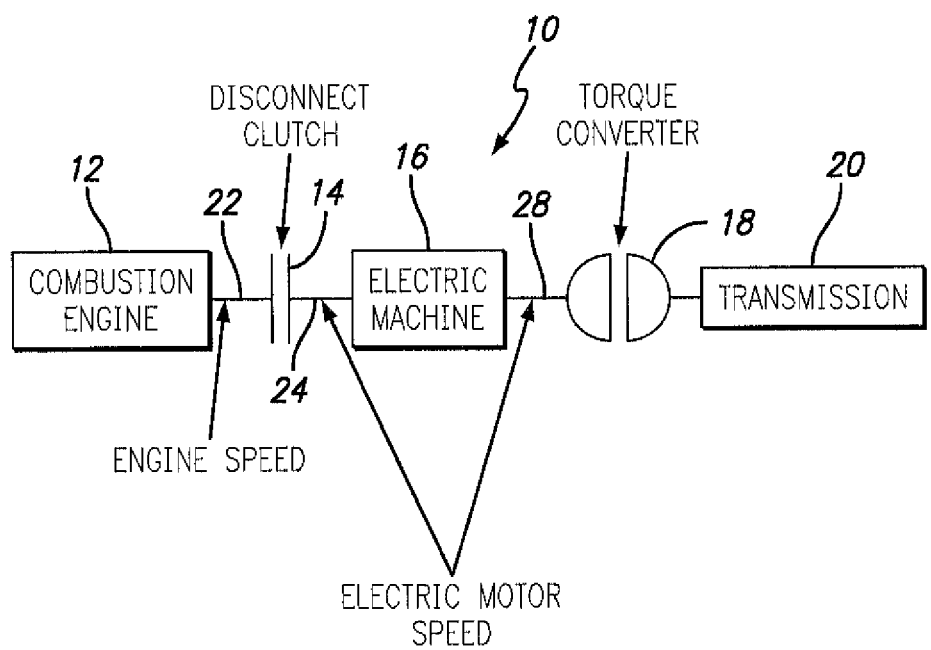
FIG. 1 illustrates a block diagram of a modular hybrid transmission driveling.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The torque transfer phase of a shift is when the torque capacity of the off-going holding element (clutch) is reduced while the torque capacity of the on-coming holding element (clutch) is increased. If the on-coming clutch torque capacity is lower than expected during the torque transfer phase of a shift, an engine flare will occur. Flare is when the engine speed exceeds some threshold above the output shaft speed multiplied by the gear ratio for the gear at the start of the shift for an up shift, or the engine speed exceeds some threshold over the output shaft speed multiplied by the gear ratio for the gear at the end of the shift for a down shift. Drivers will notice the excessive engine speed and this lowers the perceived shift quality.

Increasing the on-coming clutch torque capacity or reducing the engine torque are two ways in which flare is currently handled. Modifying clutch torque capacity can affect the output torque, which is noticeable by the driver. Reducing engine torque quickly requires spark control, which can impact fuel economy and emissions and has other limitations. Using the throttle to reduce engine torque has long response time. Accordingly, a better method is needed to control flare during shift.

With the MHT (Modular Hybrid Transmission) hardware, the disconnect clutch will be locked during a shift event if the engine is being used to apply driveling torque. This means that the electric motor can be used to apply a load (negative torque) on the engine to reduce engine flare. The response of the motor will be fast acting, without the negative effects that occur when other means of reducing engine torque are used, such as retarding spark.

The control strategy monitors the engine speed and detects increases above a threshold over the target engine speed during the torque transfer phase of a gear shift. The target engine speed is the output shaft speed multiplied by the gear ratio for the gear at the start of the shift for an up shift. The target engine speed is the output shaft speed multiplied by the gear ratio for the gear at the end of the shift for a down shift. The engine flare error state is when the engine speed exceeds the target engine speed plus a small threshold during the torque transfer phase of a gear shift. The control strategy monitors the engine acceleration and the difference between the engine speed and the target engine speed. The control strategy applies negative motor torque to control the engine speed and acceleration to a desired profile to match the actual engine speed to the target engine speed.

Closed loop control can be used to adjust the electric motor torque to the appropriate level to reduce the engine flare. The relationship between the electric current provided to the electric machine and the electric machine torque is known for a given electric machine. This allows the control strategy to command electric machine current to achieve a target electric machine torque. Closed loop control will reduce the difference between the actual engine speed and the target engine speed (desired value), calculated from the gear ratio and the output shaft speed. Closed loop control will control the electric machine current thereby controlling electric machine torque based on engine acceleration as well as the difference between engine speed and the target engine speed.

Another solution is to apply a feed forward electric machine torque in addition to the electric machine torque applied by the closed loop controller to better compensate for the excess engine torque. The relationship between electric current and electric motor torque is well known. The inertia and mass of the components accelerating with engine speed are also known. As the engine speed accelerates, the excess engine torque accelerating the engine above the target speed can be calculated. This excess engine torque can be used as a feed-forward control by applying the appropriate electric current to the electric motor to compensate for this excess engine torque. The closed loop control will account for any errors in torque estimation from these calculations.

An example control strategy for the electric motor can also use a simple proportional controller based on engine speed and engine acceleration during the torque transfer phase. The motor torque can be a function of the engine acceleration and engine speed. The faster the engine is accelerating, the more negative electrical motor torque will be necessary to bring the engine speed back to the desired level. Once the engine acceleration becomes negative, the electric motor torque can control the rate at which the engine speed decreases.

A vehicle, in one example, includes an engine, an electric machine, a transmission, a clutch configured to mechanically couple the engine and electric machine, and at least one controller configured to command a change in current to the electric machine in response to a gear shift of the transmission that causes a speed of the engine to exceed a predetermined threshold such that the speed of the engine decreases, to avoid engine flare.

Referring now to FIG. 1, a block diagram of an example modular hybrid transmission (MHT) system 10 for a hybrid electric vehicle is shown. The MHT system 10 includes a combustion engine 12, a disconnect clutch 14, an electric machine 16, a torque converter 18 and a transmission 20. Other configurations are, of course, also possible. Engine 12 has an output shaft 22 connectable to, and dis-connectable from, an input shaft 24 of electric machine 16 through disconnect clutch 14. Electric machine 16 has an output shaft 28 connected to transmission 20.

Figure 2:
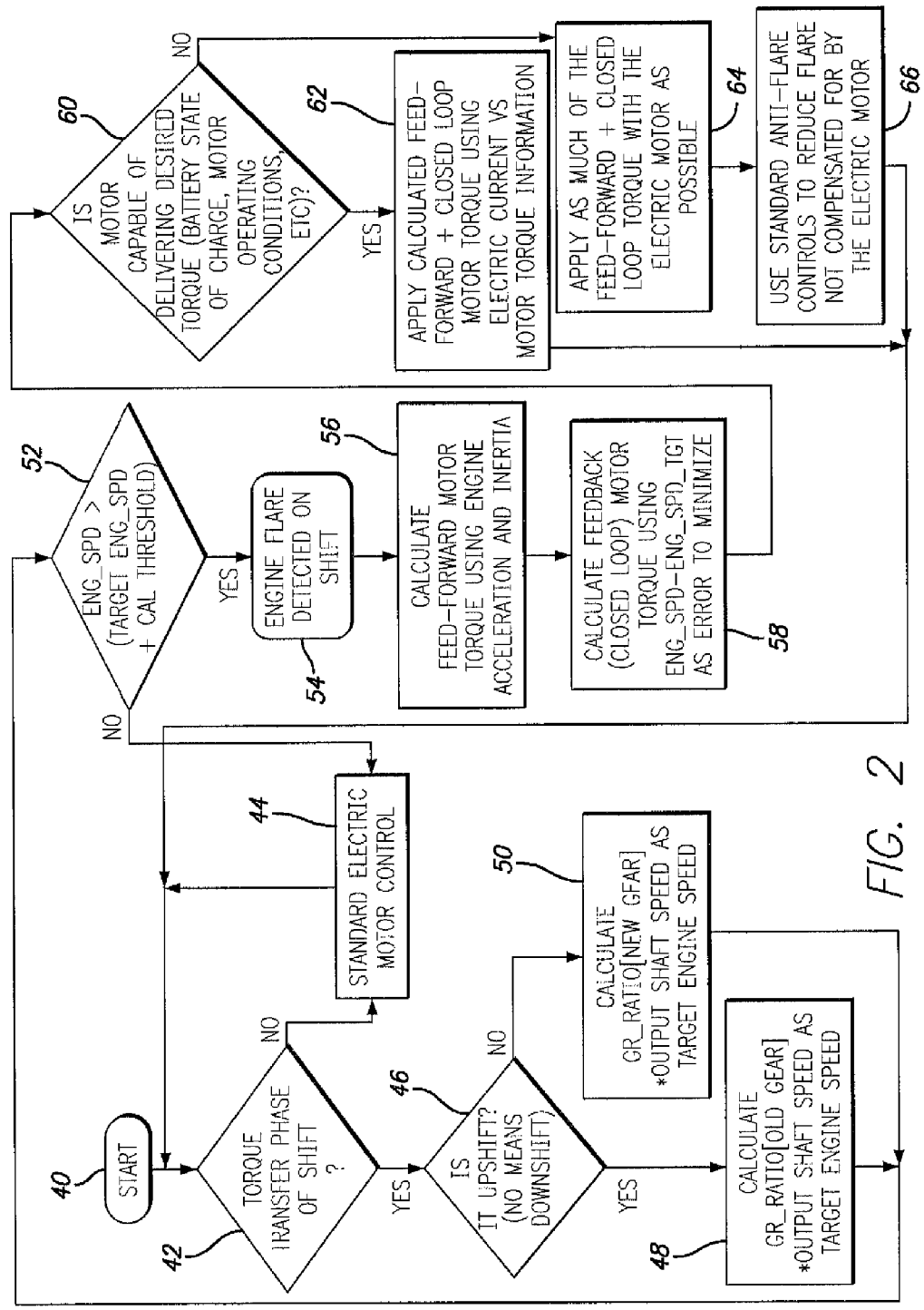
FIG. 2 illustrates a block diagram of a control algorithm for the modular hybrid transmission of FIG. 1.

Referring now to FIG. 2, a block diagram of a control algorithm describes the step-by-step control procedure to detect and control engine flare (an asterisk in a block means "multiplied by" and "TGT" means "target"). A gear shift starts 40 and it is determined if it is in torque transfer phase of shift 42. If No, the standard electric motor control 44 takes place. If Yes, the control determines if it is an up shift 46. If Yes, control calculates the target engine speed by multiplying the gear ratio [old gear] times the output shaft speed as target engine speed 48. If No, control calculates the target engine speed by multiplying the gear ratio [new gear] times the output shaft speed as target engine speed 50.

Control then determines engine speed compared to the target engine speed plus any threshold 52. If engine flare is detected on the gear shift 54, control calculates the feed-forward motor torque using engine acceleration and inertia 56 and calculates feedback (closed loop) motor torque using engine speed minus target engine speed as the error to minimize 58. Control then determines if the motor is capable of delivering the desired torque 60, checking the battery state of charge and other motor operating conditions. If Yes, control applies the calculated feed-forward and closed loop motor torque using electric current versus motor torque information 62. If No, control applies as much of the feed-forward and closed loop torque with the electric motor as possible 64 and uses standard anti-flare controls to reduce flare not compensated for by the electric motor.

Figure 3A:
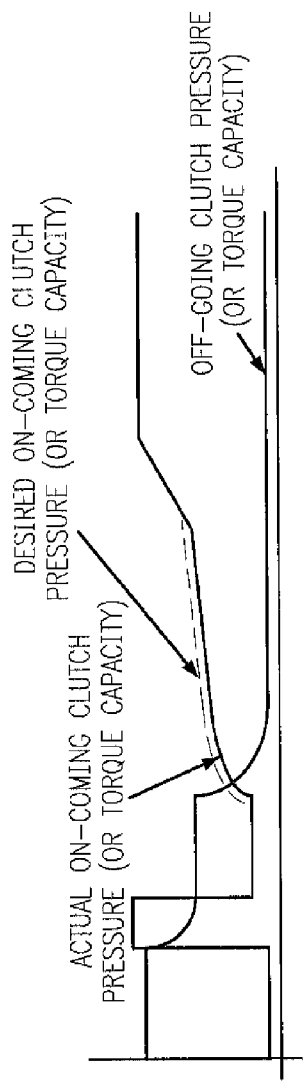
FIGS. 3(a)-(c) illustrate a graph of flare control during up shift.

Referring now to FIGS. 3(a)(c) and FIGS. 4(a)-(c), FIGS. 3(a)-(c) show flare control during up shift and FIGS. 4(a)-(c) show flare control during down shift. FIGS. 3(a) and 4(a) show the actual on-coming clutch pressure (or torque capacity), the desired on-coming clutch pressure (or torque capacity), and the off-going clutch pressure (or torque capacity). The desired on-coming clutch pressure (or torque capacity) is the clutch pressure (or torque capacity) that is required to prevent an engine flare during the torque transfer phase of the gear shift. Engine torque in excess of the sum of the actual torque capacities of the on-coming and off-going clutches will cause the engine speed to increase.

Figure 3B:
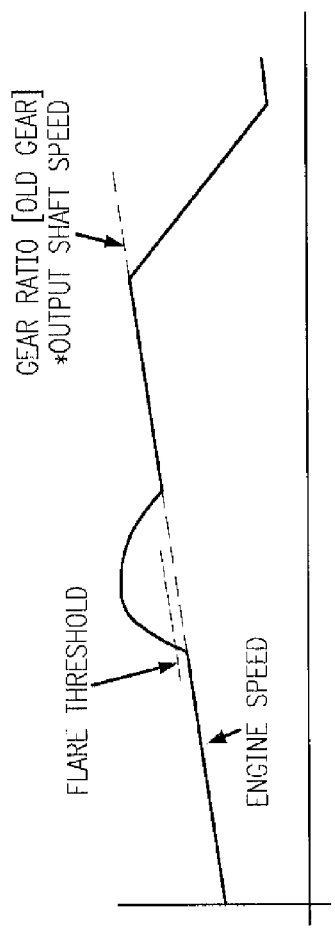

FIGS. 3(a) and 4(a) show that the actual clutch pressure (or torque capacity) is less than the desired clutch pressure (or torque capacity). FIGS. 3(b) and 4(b) show the engine speed, flare threshold, gear ratio [old gear] multiplied by the output shaft speed or gear ratio [new gear] multiplied by the output shaft speed. FIGS. 3(b) and 4(b) also show that an actual on-coming clutch pressure (or torque capacity) less than the desired clutch pressure (or torque capacity) will cause an engine speed increase during the torque transfer phase of the shift. The increase in engine speed continues until an engine flare detection threshold is crossed and the increase in engine speed is determined to be engine flare.

Figure 3C:
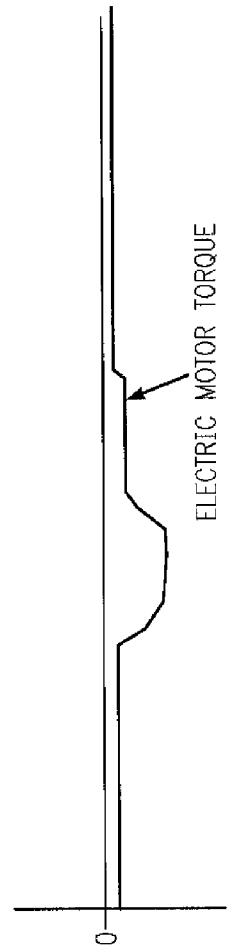

For an up shift as shown in FIGS. 3(a)-(c), the target engine speed is the output shaft speed multiplied by the gear ratio for the gear at the start of the shift. For a down shift as shown in FIGS. 4(a)-(c), the target engine speed is the output shaft speed multiplied by the gear ratio for the gear at the end of the shift. FIGS. 3(c) and 4(c) show the electric motor torque applied to eliminate the engine flare and control the engine speed and acceleration. FIGS. 3(b) and 4(b) show that the electric motor torque is applied as a function of the engine acceleration and also show the difference between the engine speed and the target engine speed. When the engine is rapidly accelerating, the electric motor torque will be increased. As the engine speed begins to decrease toward the target engine speed, the electric motor torque is decreased based on the amount of engine deceleration and the difference between the engine speed and the target engine speed. The closed loop control adjusts the electric motor torque to control the engine speed and acceleration to a desired profile to achieve the target engine speed. FIGS. 3(b) and 4(b) show the elimination of the engine flare after the electric motor torque has been applied.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling an engine of a vehicle comprising:
   in response to a gear shift of a transmission that causes a speed of the engine to exceed a predetermined speed greater than a target speed, commanding a change in current to an electric machine such that the speed of the engine decreases to the target speed.

2. The method of claim 1 further comprising commanding a rate of change in current to the electric machine to control a rate of decrease in the speed of the engine.

3. The method of claim 1 wherein, for an upshift of the transmission, the target speed is approximately equal to the product of a gear ratio of the transmission at a start of the upshift and a speed of an output shaft of the transmission.

4. The method of claim 1 wherein, for a downshift of the transmission, the target speed is approximately equal to the product of a gear ratio of the transmission at an end of the downshift and a speed of an output shaft of the transmission.

5. A vehicle comprising:
   an engine;
   an electric machine;
   a transmission; and
   at least one controller configured to, in response to a gear shift of the transmission that causes a speed of the engine to exceed a predetermined speed greater than a target speed, command a change in current to the electric machine such that the speed of the engine returns to the target speed.

6. The vehicle of claim 5 wherein the at least one controller is further configured to command a rate of change in current to the electric machine to control a rate at which the speed of the engine returns to the target speed.

7. The vehicle of claim 5 wherein the transmission includes and output shaft and wherein, for an upshift of the transmission, the target speed is approximately equal to the product of a gear ratio of the transmission at a start of the upshift and a speed of the output shaft.

8. The vehicle of claim 5 wherein the transmission includes and output shaft and wherein, for a downshift of the transmission, the target speed is approximately equal to the product of a gear ratio of the transmission at an end of the downshift and a speed of the output shaft.

9. The vehicle of claim 5 further comprising a clutch configured to mechanically couple the engine and electric machine.

* * * * *